(12) United States Patent
Tajima

(10) Patent No.: US 9,539,744 B2
(45) Date of Patent: Jan. 10, 2017

(54) SEMICONDUCTIVE ROLLER AND PRODUCTION METHOD THEREFOR

(71) Applicant: SUMITOMO RUBBER INDUSTRIES, LTD., Kobe-shi, Hyogo (JP)

(72) Inventor: Kei Tajima, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 125 days.

(21) Appl. No.: 14/700,604

(22) Filed: Apr. 30, 2015

(65) Prior Publication Data

US 2015/0316869 A1  Nov. 5, 2015

(30) Foreign Application Priority Data

May 1, 2014 (JP) .................................. 2014-094656

(51) Int. Cl.
*B29C 35/02* (2006.01)
*G03G 15/02* (2006.01)
(Continued)

(52) U.S. Cl.
CPC ........... *B29C 35/02* (2013.01); *B29C 37/0025* (2013.01); *B29C 47/0023* (2013.01); *B29C 47/881* (2013.01); *B29C 71/04* (2013.01); *C08K 3/04* (2013.01); *C08K 3/06* (2013.01); *C08K 5/14* (2013.01); *C08K 5/435* (2013.01); *C08K 13/02* (2013.01); *C08L 9/02* (2013.01); *C08L 23/16* (2013.01); *G03G 15/0233* (2013.01); *B29C 35/049* (2013.01); *B29C 35/06* (2013.01); *B29C 2035/0827* (2013.01); *B29K 2023/16* (2013.01); *B29K 2055/00* (2013.01);
(Continued)

(58) Field of Classification Search
CPC  G03G 15/0806; G03G 15/0808; G03G 15/02; G03G 15/028; G03G 15/0216; G03G 15/0233; G03G 15/0266; G03G 2215/025
See application file for complete search history.

(56) References Cited

U.S. PATENT DOCUMENTS 6,043,308 A     3/2000  Tanahashi et al.
7,144,525 B2 * 12/2006  Yoshikawa ............ B65H 27/00
                                                    252/500
(Continued)

FOREIGN PATENT DOCUMENTS

JP      11-44317 A    2/1999
JP      3449726 B2    9/2003
(Continued)

*Primary Examiner* — Jason L Vaughan
(74) *Attorney, Agent, or Firm* — Birch, Stewart, Kolasch & Birch, LLP

(57) ABSTRACT

A semiconductive roller (1) is produced by: preparing a rubber composition containing a rubber component including an NBR and an EPDM in a mass ratio of NBR/EPDM=70/30 to 30/70, at least one selected from the group consisting of SAF, ISAF and HAF, sulfur, a peroxide crosslinking agent and a sulfenamide accelerating agent; extruding the rubber composition into a tubular body; crosslinking the tubular body in a vulcanization can or with the use of a continuous crosslinking apparatus; and forming an oxide film (5) in an outer peripheral surface (4) of the tubular body by irradiation with ultraviolet radiation with a shaft (3) inserted through the tubular body.

6 Claims, 1 Drawing Sheet

(51) Int. Cl.

| | | |
|---|---|---|
| *B29C 47/00* | (2006.01) | |
| *B29C 47/88* | (2006.01) | |
| *B29C 37/00* | (2006.01) | |
| *B29C 71/04* | (2006.01) | |
| *C08K 3/04* | (2006.01) | |
| *C08K 3/06* | (2006.01) | |
| *C08K 5/14* | (2006.01) | |
| *C08K 5/435* | (2006.01) | |
| *C08K 13/02* | (2006.01) | |
| *C08L 9/02* | (2006.01) | |
| *C08L 23/16* | (2006.01) | |
| *B29K 55/00* | (2006.01) | |
| *B29K 23/00* | (2006.01) | |
| *B29K 105/16* | (2006.01) | |
| *B29K 507/04* | (2006.01) | |
| *B29L 23/00* | (2006.01) | |
| *B29C 35/04* | (2006.01) | |
| *B29C 35/06* | (2006.01) | |
| *B29C 35/08* | (2006.01) | |

(52) U.S. Cl.
CPC ...... *B29K 2105/16* (2013.01); *B29K 2507/04* (2013.01); *B29K 2995/0005* (2013.01); *B29L 2023/225* (2013.01); *Y10T 29/49565* (2015.01)

(56) References Cited

U.S. PATENT DOCUMENTS

| | | | |
|---|---|---|---|
| 7,374,527 B2 * | 5/2008 | Minagoshi | C08K 5/0025 399/176 |
| 9,011,306 B2 * | 4/2015 | Mizumoto | G03G 15/0818 399/280 |
| 9,102,822 B2 * | 8/2015 | Tomari | C08L 21/00 |
| 2004/0096247 A1 | 5/2004 | Ki et al. | |
| 2004/0106708 A1 | 6/2004 | Mizumoto et al. | |
| 2006/0074162 A1 | 4/2006 | Mizumoto et al. | |
| 2007/0243984 A1 * | 10/2007 | Mizumoto | G03G 15/0818 492/49 |
| 2007/0254792 A1 * | 11/2007 | Mizumoto | G03G 15/0818 492/53 |
| 2011/0281703 A1 | 11/2011 | Tajima et al. | |
| 2012/0129667 A1 * | 5/2012 | Mizumoto | G03G 15/1685 492/18 |
| 2013/0203573 A1 * | 8/2013 | Satoyoshi | H01B 1/125 492/59 |
| 2015/0030868 A1 | 1/2015 | Tajima | |
| 2015/0087488 A1 * | 3/2015 | Kang | H01L 51/0043 492/18 |

FOREIGN PATENT DOCUMENTS

| | | |
|---|---|---|
| JP | 2003-287965 A | 10/2003 |
| JP | 2004-163825 A | 6/2004 |
| JP | 2006-16552 A | 1/2006 |
| JP | 2007-90820 A | 4/2007 |
| JP | 2007-283659 A | 11/2007 |
| JP | 2013-117678 A | 6/2013 |

* cited by examiner

SEMICONDUCTIVE ROLLER AND PRODUCTION METHOD THEREFOR

CROSS-REFERENCE TO RELATED APPLICATION

This application corresponds to Japanese Patent Application No. 2014-94656 filed in the Japan Patent Office on May 1, 2014, the disclosure of which is incorporated herein by reference in its entirety.

TECHNICAL FIELD

The present invention relates to a semiconductive roller which can be used as a charging roller or the like in a so-called electrophotographic image forming apparatus such as a laser printer, an electrostatic copying machine, a plain paper facsimile machine or a printer-copier-facsimile multifunction machine.

BACKGROUND ART

Usable as a charging roller for uniformly electrically charging a surface of a photo receptor body in an image forming apparatus is a semiconductive roller which is produced, for example, by injecting a semiconductive rubber composition into a predetermined press mold to mold the rubber composition into a tubular body and crosslink a rubber component of the rubber composition through press-crosslinking, and inserting a shaft such as of a metal into a center through-hole of the tubular body.

With recent development and prevalence of compact and less expensive laser printers for use in small offices and for personal use, there is a demand for easy production and cost reduction of semiconductive rollers such as charging rollers to be incorporated in the laser printers.

The rubber composition is generally imparted with a semiconductive property, for example, by using an ion-conductive rubber as the rubber component, by blending an ion-conductive agent such as an ion-conductive salt to impart the composition with ion conductivity, or by blending an electrically conductive filler such as carbon black or metal powder to impart the composition with electron conductivity.

In the former case, however, the ion-conductive rubber and the ion-conductive agent are very expensive and difficult to obtain and handle. This reduces the productivity of the semiconductive rollers, and increases the production costs of the semiconductive rollers.

In the latter case, on the other hand, the rubber composition per se can be prepared at lower costs by blending a general purpose electrically conductive filler with a general purpose rubber component.

However, it is difficult to homogenously disperse the electrically conductive filler in the rubber composition, so that there are variations in the amount of the electrically conductive filler per unit volume of the outer peripheral surface of the semiconductive roller as measured in a circumferential direction and a widthwise direction of the semiconductive roller. Accordingly, the electrical resistance on the outer peripheral surface of the single semiconductive roller is not constant with variations. If the semiconductive roller suffering from the variations in the electrical resistance on the outer peripheral surface thereof is used as the charging roller, for example, it is impossible to uniformly electrically charge the surface of the photoreceptor body, resulting in defective image formation such as uneven image density.

Where the outer peripheral surface of the semiconductive roller is covered with a coating film, the variations in electrical resistance can be accommodated. Therefore, the surface of the photoreceptor body can be uniformly electrically charged, thereby suppressing the defective image formation such as uneven image density.

In addition, when the semiconductive roller is used as the charging roller or the like in direct contact with the photoreceptor body, the image formation is prevented from being adversely influenced by contamination of the photoreceptor body with a component bleeding or blooming on the outer peripheral surface from the inside of the semiconductive roller. Further, additives such as silica added to a toner for improvement of the fluidity and the electrical conductivity of the toner are prevented from being accumulated on the outer peripheral surface of the semiconductive roller. This also prevents the adverse influence on the image formation (JP-3449726-B and the like).

The coating film is generally formed by applying a coating material liquid onto the outer peripheral surface of the semiconductive roller through a coating process such as a spraying method or a dipping method, and then drying the coating liquid. Therefore, the coating film is liable to suffer from contamination with dust and other foreign matter, uneven thickness and other defects during the coating process.

In addition, the coating film formation technique, which is an established technique, has little room for improvement. Therefore, it is difficult to significantly reduce the incidence of defects (defect percentage) as compared with the current technique. This may also reduce the yield and the productivity of the semiconductive roller, and increases the production costs.

Where the ion-conductive rubber composition or the electron-conductive rubber composition is used, various types of press molds for the press-crosslinking of the rubber composition should be always prepared for different laser printer products produced by different makers or the same maker, i.e., for different outer diameters, different widths and different shaft diameters of semiconductive rollers.

Therefore, great equipment investment is required for the press molds. This may reduce the productivity of the semiconductive roller, and increase production costs.

SUMMARY OF THE INVENTION

Problem to be Solved by the Invention

It is an object of the present invention to provide a semiconductive roller which can be produced at lower costs than the prior art, and has uniform electrical resistance without variations in electrical resistance in the circumferential direction and the widthwise direction of the outer peripheral surface thereof.

Solution to Problem

According to the present invention, there is provided a semiconductive roller, which includes: a tubular body formed by crosslinking a rubber composition; a shaft inserted through the tubular body; and an oxide film provided in an outer peripheral surface of the tubular body, the rubber composition comprising: a rubber component including only an acrylonitrile butadiene rubber (NBR) and an ethylene propylene diene rubber (EPDM) in a mass ratio of NBR/EPDM=70/30 to 30/70; a predetermined proportion of at least one carbon black selected from the group consisting of SAF, ISAF and HAF, the predetermined proportion being adjusted to be less than 50 parts by mass based on 100 parts by mass of the overall rubber component so that the semiconductive roller has a roller resistance of not less than $10^4\Omega$ and not greater than $10^{6.5}\Omega$; and a crosslinking component including sulfur, a peroxide crosslinking agent and a sulfenamide accelerating agent for crosslinking the rubber component.

According to the present invention, there is further provided a semiconductive roller production method, which includes the steps of: preparing a rubber composition containing a rubber component including only an acrylonitrile butadiene rubber (NBR) and an ethylene propylene diene rubber (EPDM) in a mass ratio of NBR/EPDM=70/30 to 30/70, a predetermined proportion of at least one carbon black selected from the group consisting of SAF, ISAF and HAF, the predetermined proportion being adjusted to be less than 50 parts by mass based on 100 parts by mass of the overall rubber component so as to control roller resistance in a range of not less than $10^4\Omega$ and not greater than $10^{6.5}\Omega$, and a crosslinking component including sulfur, a peroxide crosslinking agent and a sulfenamide accelerating agent for crosslinking the rubber component; extruding the rubber composition into a tubular body in an unvulcanized state; crosslinking the unvulcanized rubber composition extruded into the tubular body in a vulcanization can or with the use of a continuous crosslinking apparatus, and then inserting a shaft through the tubular body of the vulcanized rubber composition; and forming an oxide film in an outer peripheral surface of the tubular body of the rubber composition by irradiation of the outer peripheral surface with ultraviolet radiation with the shaft inserted through the tubular body.

Effects of the Invention

According to the present invention, the NBR and the EPDM (which are general purpose rubbers) are used as the rubber component, and at least one carbon black selected from the group consisting of the SAF, the ISAF and the HAF (which are general purpose carbon blacks) is blended with the general purpose rubbers. Thus, the rubber composition as a material for the semiconductive roller can be prepared at lower costs.

The rubber composition is extruded into the tubular body, and then the tubular body of the rubber composition is crosslinked in the vulcanization can or with the use of the continuous crosslinking apparatus without the use of the press mold. Accordingly, there is no need to always prepare the various types of press molds for different outer diameters and different widths of semiconductive rollers and different shaft diameters. This eliminates the need for the great equipment investment. A die to be used for the extrusion may be changed, or conditions for the extrusion may be properly controlled for different outer diameters of the semiconductive rollers and different shaft diameters. Further, the extruded tubular body may be cut at different positions for different widths of the semiconductive rollers.

The NBR and the EPDM are used in a mass ratio of NBR/EPDM=70/30 to 30/70 as the rubber component, and at least one carbon black is selected from the aforementioned three types of carbon blacks. Further, at least the sulfur, the peroxide crosslinking agent and the sulfenamide accelerating agent are used in combination as the crosslinking component, and diene bonds of the NBR contained in the rubber composition in the outer peripheral surface are oxidized by the irradiation with the ultraviolet radiation, whereby the oxide film is formed in the outer peripheral surface of the semiconductive roller. This eliminates all the aforementioned problems occurring when the semiconductive roller is imparted with the electron conductivity by blending the carbon black.

Like the prior-art coating film, the oxide film accommodates the variations in electrical resistance occurring due to the variations in carbon black content, thereby functioning to suppress the variations in electrical resistance in the single semiconductive roller. Further, the oxide film functions to prevent the contamination of the photoreceptor body and the accumulation of the additives such as silica on the outer peripheral surface of the semiconductive roller which may otherwise occur due to the bleeding and the blooming.

In addition, unlike the coating film, the oxide film is formed through the oxidation reaction of the diene bonds of the NBR contained in the rubber composition in the outer peripheral surface of the semiconductive roller by the irradiation of the outer peripheral surface with the ultraviolet radiation. This eliminates the possibility that the oxide film is contaminated with the dust and other foreign matter during the formation of the oxide film. Further, the oxidation reaction uniformly proceeds in the outer peripheral surface of the semiconductive roller by the irradiation with the ultraviolet radiation, thereby eliminating the possibility that the oxide film has variations in thickness. This improves the yield and the productivity of the semiconductive roller.

If an electrically conductive carbon black having excellent electron conductivity is used as the carbon black, the semiconductive roller can be imparted with the semiconductive property by addition of a smaller amount of the carbon black. However, the electrically conductive carbon black is poorer in dispersibility in the rubber component, so that the content of the electrically conductive carbon black per unit volume of the outer peripheral surface of the semiconductive roller significantly varies. Therefore, the oxide film fails to sufficiently accommodate the variations in electrical resistance occurring due to the variations in the content of the electrically conductive carbon black.

Therefore, where the semiconductive roller is used as a charging roller, for example, it is impossible to uniformly electrically charge the surface of the photo receptor body. This may result in defective image formation such as uneven image density.

If FEF having greater particle diameters than the HAF is used as the carbon black, it is necessary to blend the carbon black in a great amount, i.e., in an amount of 50 parts by mass or greater based on 100 parts by mass of the overall rubber component, in order to control the roller resistance of the semiconductive roller at not higher than $10^{6.5}\Omega$.

Therefore, the processability is reduced when the rubber composition is prepared by kneading the components, and when the rubber composition is extruded into the tubular body. Even if the rubber composition can be properly extruded into the tubular body, the tubular body has a higher hardness after the crosslinking, failing to ensure smooth insertion of the shaft.

Where at least one carbon black selected from the group consisting of the SAF, the ISAF and the HAF is used as the carbon black, in contrast, these carbon blacks can be more homogeneously dispersed in the rubber composition than the electrically conductive carbon black. Therefore, the variations in carbon black content and, hence, the variations in electrical resistance can be reduced to be sufficiently accommodated by the oxide film formed in the outer peripheral surface of the semiconductive roller.

In order to control the roller resistance of the semiconductive roller at not higher than $10^{6.5}\Omega$, it is merely necessary to blend at least one of the three types of carbon blacks in a proportion of less than 50 parts by mass based on 100 parts by mass of the overall rubber component. Therefore, the processability is improved when the rubber composition is prepared by kneading the components, and when the prepared rubber composition is extruded into the tubular body. Thus, the tubular body can be properly formed. Further, the tubular body has an improved flexibility after the crosslinking, thereby permitting smooth insertion of the shaft.

If the proportion of the NBR out of the two types of rubbers (the NBR and the EPDM) is smaller than the aforementioned range, the proportion of the diene bonds of the NBR is reduced. Therefore, the oxide film cannot be formed as having a sufficient thickness, a sufficient strength and excellent functions described above in the outer peripheral surface of the semiconductive roller.

On the other hand, the EPDM functions to improve the ozone resistance, the aging resistance and the weather resistance of the semiconductive roller. If the proportion of the EPDM is smaller than the aforementioned range, the semiconductive roller is insufficient in these resistances. Therefore, the outer peripheral surface is liable to be cracked when being irradiated with the ultraviolet radiation for the formation of the oxide film.

Where only the two types of rubbers including the NBR and the EPDM are used in a mass ratio of NBR/EPDM=70/30 to 30/70 as the rubber component, in contrast, the oxide film can be formed as having a sufficient thickness, a sufficient strength and excellent functions as described above in the outer peripheral surface of the semiconductive roller by the irradiation with the ultraviolet radiation while the cracking is suppressed.

If only the peroxide crosslinking agent is used as the crosslinking component and the sulfur and the sulfenamide accelerating agent are not used, the rubber component cannot be properly crosslinked in the vulcanization can or with the use of the continuous crosslinking apparatus in the presence of oxygen. Therefore, when the semiconductive roller is used as the charging roller in contact with the photoreceptor body, for example, the charging roller is liable to adhere to the photoreceptor body.

If only the sulfur and the sulfenamide accelerating agent are used and the peroxide crosslinking agent is not used, the crosslinking reaction can proceed in the vulcanization can or in the continuous crosslinking apparatus, but the crosslinking is not sufficient. Therefore, if the semiconductive roller is kept in contact with the photoreceptor body for a longer period of time, a contact portion of the semiconductive roller is compressively deformed. This may result in defective image formation, i.e., a nip mark will be formed in a position of an image corresponding to the compressively deformed portion of the semiconductive roller.

Where the sulfur, the peroxide crosslinking agent and the sulfenamide accelerating agent are used in combination as the crosslinking component, in contrast, the rubber component can be sufficiently crosslinked in the vulcanization can or with the use of the continuous crosslinking apparatus. Thus, the semiconductive roller is free from the adhesion and the permanent compressive deformation.

The roller resistance of the semiconductive roller is limited to the range of not less than $10^4$ and not greater than $10^{6.5}\Omega$. If the roller resistance is less than or greater than this range, the semiconductive roller will cause defective image formation, making it impossible to properly form an image when being used as the charging roller. Where the roller resistance falls within the aforementioned range, in contrast, the semiconductive roller ensures proper image formation without image forming failure particularly when being used as the charging roller.

EMBODIMENTS OF THE INVENTION

Figure 1:
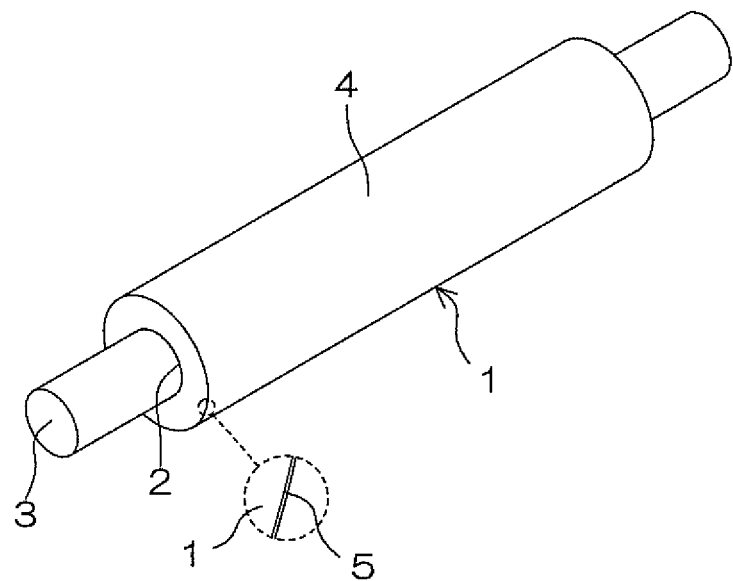
FIG. 1 is a perspective view illustrating an exemplary semiconductive roller according to one embodiment of the present invention.

A semiconductive roller according to the present invention is produced by: preparing a rubber composition containing a rubber component including only an NBR and an EPDM in a mass ratio of NBR/EPDM=70/30 to 30/70, a predetermined proportion of at least one carbon black selected from the group consisting of SAF, ISAF and HAF, the predetermined proportion being adjusted to be less than 50 parts by mass based on 100 parts by mass of the overall rubber component so that the semiconductive roller has a roller resistance of not less than $10^4\Omega$ and not greater than $10^{6.5}\Omega$, and a crosslinking component including sulfur, a peroxide crosslinking agent and a sulfenamide accelerating agent for crosslinking the rubber component; extruding the rubber composition into a tubular body; crosslinking the tubular body of the rubber composition in a vulcanization can or with the use of a continuous crosslinking apparatus; inserting a shaft through the tubular body; and forming an oxide film in an outer peripheral surface of the tubular body by irradiation with ultraviolet radiation.

<<Rubber Composition>>
<Rubber Component>

As described above, only the NBR and the EPDM are used in a mass ratio of NBR/EPDM=70/30 to 30/70 as the rubber component.

If the proportion of the NBR is less than this range, the proportion of diene bonds of the NBR is reduced. Therefore, the oxide film cannot be formed as having a sufficient thickness, a sufficient strength and excellent functions described above in the outer peripheral surface of the semiconductive roller.

If the proportion of the EPDM is less than the aforementioned range, on the other hand, it will be impossible to sufficiently provide the effect of improving the ozone resistance, the aging resistance and the weather resistance of the semiconductive roller by the EPDM. Therefore, the outer peripheral surface is liable to be cracked when being irradiated with the ultraviolet radiation for the formation of the oxide film.

Where only the NBR and the EPDM are used in the aforementioned mass ratio as the rubber component, the oxide film can be formed as having a sufficient thickness, a sufficient strength and excellent functions described above in the outer peripheral surface of the semiconductive roller by the irradiation with the ultraviolet radiation while the cracking is suppressed.

(NBR)

The NBR is classified in a lower acrylonitrile content type, an intermediate acrylonitrile content type, an intermediate to higher acrylonitrile content type, a higher acrylonitrile content type or a very high acrylonitrile content type depending on the acrylonitrile content. Any of these types of NBRs is usable.

These NBRs may be used either alone or in combination.
(EPDM)

Usable as the EPDM are various EPDMs each prepared by introducing double bonds into a main chain thereof by employing a small amount of a third monomer (diene) in addition to ethylene and propylene. A variety of EPDM products containing different types of third monomers in different amounts are commercially available. Typical examples of the third monomers include ethylidene norbornene (ENB), 1,4-hexadiene (1,4-HD) and dicyclopentadiene (DCP).

These EPDMs may be used either alone or in combination.

<Carbon Black>

As described above, at least one carbon black is selected from the group consisting of SAF, ISAF and HAF for use.

Where an electrically conductive carbon black other than the aforementioned three types of carbon blacks is used, the carbon black content per unit volume of the outer peripheral surface of the semiconductive roller significantly varies because the electrically conductive carbon black has a lower dispersibility in the rubber component. Therefore, the oxide film cannot sufficiently accommodate the variations in electrical resistance occurring due to the variations in carbon black content.

Therefore, where the semiconductive roller is used as a charging roller, for example, the semiconductive roller fails to uniformly electrically charge a surface of a photoreceptor body, resulting in defective image formation such as uneven image density.

If FEF having greater particle size than the HAF is used, the carbon black should be blended in a proportion of not less than 50 parts by mass based on 100 parts by mass of the overall rubber component in order to control the roller resistance of the semiconductive roller at a level of not higher than $10^{6.5}\Omega$.

Therefore, the processability is reduced when the rubber composition is prepared by kneading the components, and when the rubber composition is extruded into the tubular body. Therefore, the tubular body cannot be properly formed. Even if the rubber composition can be properly extruded into the tubular body, the tubular body has a higher hardness after the crosslinking, failing to ensure smooth insertion of the shaft.

Where at least one carbon black selected from the group consisting of SAF, ISAF and HAF is used as the carbon black, on the other hand, these carbon blacks can be more homogeneously dispersed in the rubber composition than the electrically conductive carbon black. Therefore, the variations in carbon black content and, hence, the variations in electrical resistance can be reduced to be sufficiently accommodated by the oxide film formed in the outer peripheral surface of the semiconductive roller.

In order to control the roller resistance of the semiconductive roller at not higher than $10^{6.5}\Omega$, it is merely necessary to blend at least one of the three types of carbon blacks in a proportion of less than 50 parts by mass based on 100 parts by mass of the overall rubber component. Therefore, the processability can be improved when the rubber composition is prepared by kneading the components, and when the prepared rubber composition is extruded into the tubular body. Thus, the tubular body can be properly formed.

Further, the tubular body has an improved flexibility after the crosslinking, thereby ensuring smooth insertion of the shaft.

The proportion of the carbon black to be blended is less than 50 parts by mass based on 100 parts by mass of the overall rubber component, and may be determined so that the semiconductive roller has a roller resistance of not less than $10^4\Omega$ and not greater than $10^{6.5}\Omega$ as measured by a measurement method to be described later.

More specifically, an optimum proportion of the carbon black may be determined in a range less than 50 parts by mass based on 100 parts by mass of the overall rubber component according to the type or types of one or two or more carbon blacks selected from the three types of carbon blacks, the mass ratio between the NBR and the EPDM to be used in combination as the rubber component, the types of ingredients to be used in combination as the crosslinking component, and a target roller resistance.

Where the carbon black is the SAF, for example, the proportion of the SAF is preferably not less than 22.5 parts by mass and not greater than 32.5 parts by mass based on 100 parts by mass of the overall rubber component. Where the carbon black is the ISAF, the proportion of the ISAF is preferably not less than 27.5 parts by mass and not greater than 35 parts by mass based on 100 parts by mass of the overall rubber component. Where the carbon black is the HAF, the proportion of the HAF is preferably not less than 32.5 parts by mass and not greater than 40 parts by mass based on 100 parts by mass of the overall rubber component.

<Crosslinking Component>

As described above, the at least three types of ingredients including the sulfur, the peroxide crosslinking agent and the sulfenamide accelerating agent are used in combination as the crosslinking component. Thus, the rubber component can be sufficiently crosslinked in the vulcanization can or with the use of the continuous crosslinking apparatus, whereby the semiconductive roller is free from the adhesion to the photoreceptor body and the permanent compressive deformation.

(Sulfur)

Various types of sulfur functioning as a crosslinking agent (vulcanization agent) are usable. Particularly, sulfur powder is preferred.

The proportion of the sulfur to be blended is preferably not less than 0.5 parts by mass and not greater than 2.5 parts by mass based on 100 parts by mass of the overall rubber component.

If the proportion of the sulfur is less than the aforementioned range, it will be impossible to sufficiently crosslink the rubber component in the vulcanization can or with the use of the continuous crosslinking apparatus. If the proportion of the sulfur is greater than the aforementioned range, an excess amount of the sulfur is liable to bloom on the outer peripheral surface of the semiconductive roller to contaminate the photoreceptor body.

Where the proportion of the sulfur falls within the aforementioned range, on the other hand, it is possible to more advantageously crosslink the rubber component while preventing the blooming.

(Peroxide Crosslinking Agent)

Examples of the peroxide crosslinking agent include dibenzoyl peroxide, dicumyl peroxide, 2,5-dimethyl-2,5-di(t-butylperoxy)hexane, α,α'-di(t-butylperoxy)diisopropylbenzene, t-butyl cumyl peroxide, di-t-hexyl peroxide, di-t-butyl peroxide, 2,5-dimethyl-2,5-bis(t-butylperoxy)hexyne-3, 1,1-di(t-hexylperoxy)cyclohexane, 1,1-di(t-butylperoxy)cyclohexane, n-butyl-4,4-di(t-butylperoxy)valerate, 2,5- dimethyl-2,5-di(benzoylperoxy)hexane, t-hexyl peroxybenzoate and t-butyl peroxybenzoate, which may be used either alone or in combination.

The proportion of the peroxide crosslinking agent to be blended is preferably not less than 1.0 part by mass and not greater than 3.0 parts by mass based on 100 parts by mass of the overall rubber component.

If the proportion of the peroxide crosslinking agent is less than the aforementioned range, it will be impossible to sufficiently crosslink the rubber component in the vulcanization can or with the use of the continuous crosslinking apparatus. If the proportion of the peroxide crosslinking agent is greater than the aforementioned range, on the other hand, the tubular body is liable to have a higher hardness after the crosslinking, thereby preventing the smooth insertion of the shaft.

Where the proportion of the peroxide crosslinking agent falls within the aforementioned range, in contrast, it is possible to more advantageously crosslink the rubber component while allowing the tubular body to have proper flexibility after the crosslinking.

(Sulfenamide Accelerating Agent)

Examples of the sulfenamide accelerating agent include N-cyclohexyl-2-benzothiazolylsulfenamide, N-oxydiethylene-2-benzothiazolylsulfenamide, N-tert-butyl-2-benzothiazolylsulfenamide and N,N-diisopropyl-2-benzothiazolylsulfenamide, which may be used either alone or in combination.

The proportion of the sulfenamide accelerating agent to be blended is preferably not less than 0.5 parts by mass and not greater than 2.0 parts by mass based on 100 parts by mass of the overall rubber component.

If the proportion of the sulfenamide accelerating agent is less than the aforementioned range, it will be impossible to sufficiently crosslink the rubber component in the vulcanization can or with the use of the continuous crosslinking apparatus. If the proportion of the sulfenamide accelerating agent is greater than the aforementioned range, on the other hand, the tubular body is liable to have a higher hardness after the crosslinking, thereby preventing the smooth insertion of the shaft.

Where the proportion of the sulfenamide accelerating agent falls within the aforementioned range, in contrast, it is possible to more advantageously crosslink the rubber component while allowing the tubular body to have proper flexibility after the crosslinking.

(Other Ingredients for Crosslinking Component)

An accelerating agent and a crosslinking assisting agent other than the aforementioned three types of ingredients may be additionally blended as the crosslinking component.

Examples of the crosslinking assisting agent include metal oxides such as zinc oxide, and fatty acids such as stearic acid, oleic acid and cotton seed fatty acids, which may be used either alone or in combination.

The proportion of the crosslinking assisting agent to be blended is preferably not less than 3 parts by mass and not greater than 10 parts by mass based on 100 parts by mass of the overall rubber component.

<Other Components>

At least one additive selected from the group consisting of a filler, an anti-aging agent, an anti-oxidant, an anti-scorching agent, a lubricant, a pigment, a flame retarder, a neutralizing agent and a defoaming agent may be blended in the rubber composition.

These additives improve the processability when the rubber composition is prepared by kneading the aforementioned components and when the rubber composition is extruded into the tubular body, and improve the mechanical strength and the durability of the semiconductive roller produced by crosslinking the rubber component after the extrusion. Further, these additives improve the rubber properties of the semiconductive roller, i.e., characteristic properties that ensure a proper flexibility and a smaller compressive permanent set and prevent permanent compressive deformation.

Examples of the filler include zinc oxide, silica, carbon black other than the aforementioned three types of carbon blacks, clay, talc, calcium carbonate, magnesium carbonate, aluminum hydroxide and alumina. Preferably usable as the carbon black is insulative or less electrically conductive carbon black which does not cause variations in the electrical resistance of the same semiconductive roller.

Examples of the anti-scorching agent include N-cyclohexylthiophthalimide, phthalic anhydride, N-nitrosodiphenylamine and 2,4-diphenyl-4-metyl-1-pentene.

Conventionally known compounds may be used as the other components.

The rubber composition containing the aforementioned components can be prepared in a conventional manner. More specifically, the NBR and the EPDM are blended in the predetermined mass ratio, and the resulting rubber component is simply kneaded. Then, additives other than the crosslinking component are added to and kneaded with the rubber component, and finally the crosslinking component is added to and further kneaded with the resulting mixture. Thus, the rubber component is prepared.

A kneader, a Banbury mixer, an extruder or the like, for example, is usable for the kneading.

<<Semiconductive Roller>>

FIG. 1 is a perspective view illustrating an exemplary semiconductive roller according to one embodiment of the present invention.

Referring to FIG. 1, the semiconductive roller 1 according to this embodiment is produced by forming the rubber composition including the aforementioned components into a tubular body, inserting a shaft 3 through a center throughhole 2 of the tubular body, fixing the shaft 3 to the tubular body, and forming an oxide film 5 in an outer peripheral surface 4 of the tubular body by irradiation with ultraviolet radiation.

The shaft 3 is a unitary member made of a metal such as aluminum, an aluminum alloy or a stainless steel. The shaft 3 is electrically connected to and mechanically fixed to the semiconductive roller 1, for example, via an electrically conductive adhesive agent. Thus, the shaft 3 and the semiconductive roller 1 are unitarily rotatable.

The semiconductive roller 1 is incorporated in an electrophotographic image forming apparatus such as a laser printer, and advantageously used as a charging roller for uniformly electrically charging a surface of a photoreceptor body Where the semiconductive roller 1 is used as the charging roller, the semiconductive roller 1 preferably has a thickness of not less than 0.5 mm and not greater than 15 mm, more preferably not greater than 10 mm, particularly preferably not less than 1 mm and not greater than 7 mm, in order to provide a proper nip width while ensuring size reduction and weight reduction of the charging roller.

The semiconductive roller 1 is produced through the following process by using the rubber composition containing the aforementioned component.

The rubber composition is kneaded and heat-melted and, in this state, extruded into an elongated tubular body through a die having a shape corresponding to the sectional shape (i.e., annular shape) of the semiconductive roller 1 by means of an extruder.

Then, the tubular body is cooled to be solidified, and cut to a predetermined length. Then, a temporary vulcanization shaft is inserted into a through-hole 2 of the tubular body and, in this state, the tubular body is put in a vulcanization can. In turn, a hot steam is supplied into the vulcanization can, whereby the rubber component is crosslinked by heat and pressure.

Alternatively, the tubular body formed by the extrusion is transported in the elongated state through a continuous crosslinking apparatus to be thereby continuously crosslinked. Then, the resulting tubular body is cut to a predetermined length.

Subsequently, a shaft 3 having an outer peripheral surface to which an electrically conductive adhesive agent is applied is inserted into the through-hole 2. Where the adhesive agent is a thermosetting adhesive agent, the adhesive agent is thermally cured to electrically connect and mechanically fix the semiconductive roller 1 to the shaft 3.

As required, opposite end portions of the semiconductive roller 1 are cut, or the outer peripheral surface 4 is polished to a predetermined surface roughness. Then, the semiconductive roller 1 is irradiated with ultraviolet radiation, whereby diene bonds of the NBR contained in the rubber composition in the outer peripheral surface are oxidized. Thus, an oxide film. 5 is formed in the outer peripheral surface 4. In this manner, the semiconductive roller 1 shown in FIG. 1 is produced.

Since the semiconductive roller 1 is formed from the rubber composition containing the aforementioned components and, in addition, the outer peripheral surface 4 is covered with the oxide film 5, the semiconductive roller 1 has a uniform electrical resistance without variations in electrical resistance in a circumferential direction and a widthwise direction of the outer peripheral surface. Further, there is no possibility of defective image formation which may otherwise occur due to the contamination of the photoreceptor body and accumulation of toner on the outer peripheral surface. In addition, the semiconductive roller 1 can be produced at lower costs because the aforementioned rubber composition and the aforementioned process are employed.

The semiconductive roller 1 may have a double layer structure including an outer layer provided on the side of the outer peripheral surface 4 and an inner layer provided on the side of the shaft 3. In this case, at least the outer layer may satisfy the requirements of the present invention.

The semiconductive roller 1 may have a porous structure, but preferably has a non-porous structure for improvement of the abrasion resistance and for prevention of a nip mark which may otherwise occur due to permanent compressive deformation as described above.

As described above, the semiconductive roller 1 is required to have a roller resistance of not less than $10^4 \Omega$ and less than $10^{6.5} \Omega$. The roller resistance is measured after the formation of the oxide film 5 in the outer peripheral surface 4.

<<Measurement of Roller Resistance>>

Figure 2:
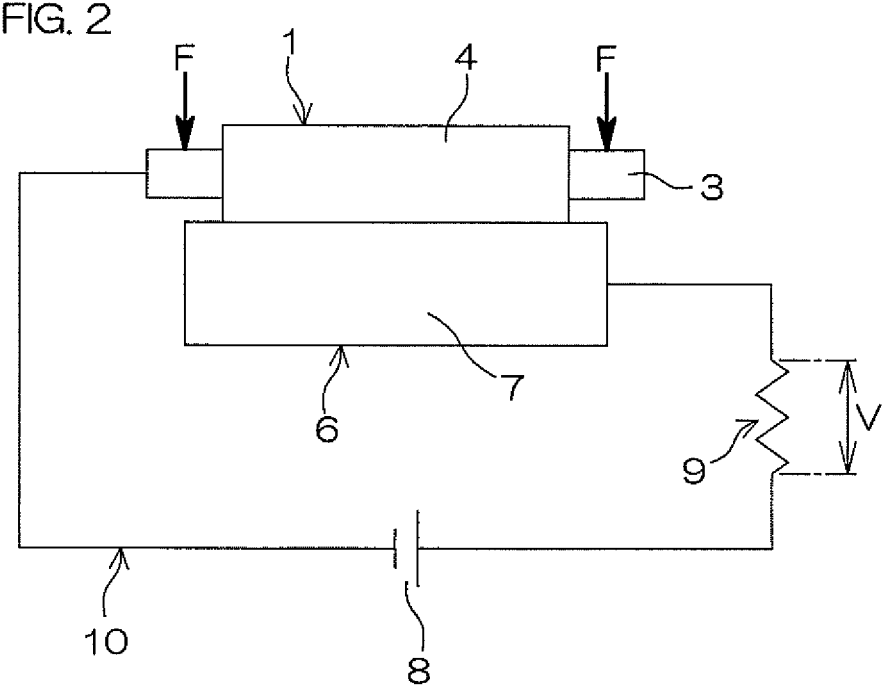
FIG. 2 is a diagram for explaining how to measure the roller resistance of the semiconductive roller.

FIG. 2 is a diagram for explaining how to measure the roller resistance of the semiconductive roller 1.

Referring to FIGS. 1 and 2, the roller resistance of the semiconductive roller 1 is expressed as a value determined in the following manner in an ordinary temperature and ordinary humidity environment at a temperature of 23° C. at a relative humidity of 55% with an application voltage of 50 V in the present invention.

An aluminum drum 6 rotatable at a constant rotation speed is prepared, and the outer peripheral surface 4 (formed with the oxide film 5) of the semiconductive roller 1 to be subjected to the measurement of the roller resistance is brought into contact with an outer peripheral surface 7 of the aluminum drum 6 from above.

A DC power source 8 and a resistor 9 are connected in series between the shaft 3 of the semiconductive roller 1 and the aluminum drum 6 to provide a measurement circuit 10. The DC power source 8 is connected to the shaft 3 at its negative terminal, and connected to the resistor 9 at its positive terminal. The resistor 9 has a resistance r of 100Ω.

Subsequently, a load F of 450 g is applied to opposite end portions of the shaft 3 to bring the semiconductive roller 1 into press contact with the aluminum drum 6 and, in this state, a detection voltage V applied to the resistor 9 is measured by applying an application voltage E of DC 50 V from the DC power source 8 between the shaft 3 and the aluminum drum 6 while rotating the aluminum drum 6 (at a rotation speed of 40 rpm).

The roller resistance R of the semiconductive roller 1 is calculated from the following expression (1') based on the detection voltage V and the application voltage E (=50 V):

$$R = r \times E/(V-r) \tag{1'}$$

However, the term (−r) in the denominator of the expression (1') is negligible, so that the roller resistance of the semiconductive roller 1 is expressed as a value calculated from the following expression (1) in the present invention:

$$R = r \times E/V \tag{1}$$

As described above, a temperature of 23° C. and a relative humidity of 55% are employed as conditions for the measurement.

The semiconductive roller 1 may be controlled as having a desired hardness and a desired compressive permanent set according to its use purpose. In order to control the hardness, the compressive permanent set, the roller resistance and the like, the mass ratio NBR/EPDM between the NBR and the EPDM may be controlled in the aforementioned range, or the types and the amounts of the sulfur, the peroxide crosslinking agent and the sulfenamide accelerating agent as the crosslinking component, or the types and the amounts of the carbon black, the filler and other component may be controlled.

The inventive semiconductive roller can be used not only as the charging roller but also as a developing roller, a transfer roller, a cleaning roller or the like, for example, in an electrophotographic image forming apparatus such as a laser printer, an electrostatic copying machine, a plain paper facsimile machine or a printer-copier-facsimile multifunction machine.

EXAMPLES

Example 1

First, 70 parts by mass of an NBR (lower-acrylonitrile content NBR JSR (registered trade name) N250SL of non-oil-extension type available from JSR Co., Ltd., and having an acrylonitrile content of 19.5%) and 30 parts by mass of an EPDM (ESPRENE (registered trade name) 505A of non-oil-extension type available from Sumitomo Chemical Co., Ltd., and having an ethylene content of 50% and a diene content of 9.5%) were simply kneaded as a rubber component by means of a 9-L kneader, and ingredients shown below in Table 1 were added to the rubber component in the aforementioned manner. The resulting mixture was further kneaded. Thus, a rubber composition was prepared.

The mass ratio between the NBR and the EPDM was NBR/EPDM=70/30.

TABLE 1

| Ingredients | Parts by mass |
|---|---|
| ISAF | 30 |
| Sulfur powder | 1.50 |
| Accelerating agent CZ | 1.00 |
| Peroxide crosslinking agent | 2.00 |
| Zinc oxide Type 2 | 5 |

The ingredients shown in Table 1 are as follows: ISAF: Carbon black (SEAST 6 available from Tokai Carbon Co., Ltd.)
Sulfur powder: Crosslinking agent (available from Tsurumi Kagaku Kogyo Co., Ltd.)
Accelerating agent CZ:
N-cyclohexyl-2-benzothiozolylsulfenamide (NOCCELER (registered trade name) CZ available from Ouchi Shinko Chemical Industrial Co., Ltd.)
Peroxide accelerating agent: Dicumyl peroxide (PERCUMYL (registered trade name) D available from NOF Corporation)
Zinc oxide Type 2: Crosslinking assisting agent (available from Mitsui Mining & Smelting Co., Ltd.) The amounts (parts by mass) is based on 100 parts by mass of the rubber component described above.

Subsequently, the rubber composition thus prepared was fed into a φ60 extruder, and extruded into a tubular body having an outer diameter of 11.0 mm and an inner diameter of 5.5 mm. Then, a temporary vulcanization shaft having an outer diameter of 3 mm was inserted into a center throughhole of the tubular body, and the tubular body was heated in a vulcanization can at 160° C. for 30 minutes for crosslinking.

Then, the tubular body was removed from the temporary shaft, then fitted around a metal shaft having an outer diameter of 6 mm and an outer peripheral surface to which an electrically conductive thermosetting adhesive agent (polyamide adhesive agent) was applied, and heated in an oven at 150° C. for 60 minutes. Thus, the tubular body was bonded to the shaft. In turn, opposite end portions of the tubular body were cut, and the outer peripheral surface of the resulting tubular body was polished to an outer diameter of 8.5 mm by a wide polishing machine.

After the polished outer peripheral surface was wiped with an alcohol, the tubular body was set in a UV treatment apparatus with the outer peripheral surface spaced 50 mm from a UV light source. Then, the outer peripheral surface was irradiated with ultraviolet radiation for 5 minutes while the tubular body was rotated at 30 rpm, whereby an oxide film was formed in the outer peripheral surface. Thus, a semiconductive roller was produced.

Examples 2 and 3 and Comparative Examples 1 and 2

Rubber compositions were prepared in substantially the same manner as in Example 1, except that the mass ratio between the NBR and the EPDM was NBR/EPDM=80/20 (Comparative Example 1), 50/50 (Example 2), 30/70 (Example 3) and 20/80 (Comparative Example 2), respectively. Semiconductive rollers were produced in the same manner as in Example 1 by using the rubber compositions thus prepared.

Comparative Example 3

A rubber composition was prepared in substantially the same manner as in Example 1, except that the sulfur powder and the accelerating agent CZ were not blended. A semiconductive roller was produced in the same manner as in Example 1 by using the rubber composition thus prepared. The mass ratio between the NBR and the EPDM was NBR/EPDM=70/30.

Comparative Example 4

A rubber composition was prepared in substantially the same manner as in Example 1, except that the peroxide crosslinking agent was not blended. A semiconductive roller was produced in the same manner as in Example 1 by using the rubber composition thus prepared. The mass ratio between the NBR and the EPDM was NBR/EPDM=70/30.

Examples 4 and 5 and Comparative Examples 5 and 6

Rubber compositions were prepared in substantially the same manner as in Example 1, except that the proportion of the ISAF was 25 parts by mass (Comparative Example 5), 27.5 parts by mass (Example 4), 35 parts by mass (Example 5) and 40 parts by mass (Comparative Example 6), respectively, based on 100 parts by mass of the overall rubber component. Semiconductive rollers were produced in the same manner as in Example 1 by using the rubber compositions thus prepared.

Examples 6 and 7 and Comparative Examples 7 and 8

Rubber compositions were prepared in substantially the same manner as in Example 1, except that SAF (SEAST 9 available from Tokai Carbon Co., Ltd.) was blended instead of the ISAF in proportions of 20 parts by mass (Comparative Example 7), 22.5 parts by mass (Example 6), 32.5 parts by mass (Example 7) and 35 parts by mass (Comparative Example 8), respectively, based on 100 parts by mass of the overall rubber component. Semiconductive rollers were produced in the same manner as in Example 1 by using the rubber compositions thus prepared.

Examples 8 and 9 and Comparative Examples 9 and 10

Rubber compositions were prepared in substantially the same manner as in Example 1, except that HAF (SEAST 3 available from Tokai Carbon Co., Ltd.) was blended instead of the ISAF in proportions of 30 parts by mass (Comparative Example 9), 32.5 parts by mass (Example 8), 40 parts by mass (Example 9) and 45 parts by mass (Comparative Example 10), respectively, based on 100 parts by mass of the overall rubber component. Semiconductive rollers were produced in the same manner as in Example 1 by using the rubber compositions thus prepared.

Comparative Example 11

A rubber composition was prepared in substantially the same manner as in Example 1, except that FEF (SEAST SO available from Tokai Carbon Co., Ltd.) was blended instead of the ISAF in a proportion of 50 parts by mass based on 100 parts by mass of the overall rubber component. A semiconductive roller was produced in the same manner as in Example 1 by using the rubber composition thus prepared.

Comparative Examples 12 and 13

Rubber compositions were prepared in substantially the same manner as in Example 1, except that an electrically conductive carbon black (DENKA BLACK (registered trade name) available from Denki Kagaku Kogyo K.K.) was blended instead of the ISAF in proportions of 20 parts by mass (Comparative Example 12) and 30 parts by mass (Comparative Example 13), respectively, based on 100 parts by mass of the overall rubber component. Semiconductive rollers were produced in the same manner as in Example 1 by using the rubber compositions thus prepared.

<Evaluation for Processability>

The semiconductive rollers were each evaluated for processability when the metal shaft was inserted into the through-hole after the crosslinking. A semiconductive roller which permitted smooth insertion of the metal shaft was rated as having excellent processability (o), and a semiconductive roller which prevented smooth insertion of the metal shaft was rated as having poor processability (x).

<Evaluation for Durability>

A semiconductive roller which suffered from cracking in an outer peripheral surface thereof due to the irradiation with the ultraviolet radiation was rated as having poor durability (x), and a semiconductive roller which was free from the cracking was rated as having excellent durability (o).

<Measurement of Roller Resistance>

The roller resistance of each of the semiconductive rollers produced in Examples and Comparative Examples was measured in an ordinary temperature and ordinary humidity environment at a temperature of 23° C. at a relative humidity of 55% with an application voltage of 50 V by the measurement method described above. The roller resistance was expressed in the form of log R in the following tables.

<Actual Machine Test>

A toner cartridge (CRG-316BLK available from Canon Inc.) to be removably mounted in a laser printer body and including a photoreceptor body and a charging roller constantly kept in contact with a surface of the photoreceptor body was prepared. The semiconductive rollers produced in Examples and Comparative Examples were each incorporated as a charging roller instead of the original charging roller in the toner cartridge.

(Initial Image Evaluation)

The toner cartridge thus assembled was immediately mounted in a color laser printer (LBP5050 available from Canon Inc.), and a halftone image and a solid image were formed as initial images and checked for evaluation.

In the evaluation, a semiconductive roller suffering from defective image formation was rated as unacceptable (x), and a semiconductive roller free from defective image formation was rated as acceptable (o).

(Image Evaluation after Sheet Passage)

After the mounting of the toner cartridge, sheets were passed through the toner cartridge at a rate of 2 sheets per minute and 500 sheets per day for 5 days. Then, a halftone image and a solid image were each printed continuously on 5 sheets after the sheet passage, and checked for evaluation.

In the evaluation, a semiconductive roller suffering from defective image formation during the continuous printing was rated as unacceptable (x), and a semiconductive roller free from defective image formation was rated as acceptable (o).

(Storage Test)

In a storage test, another toner cartridge was assembled in the aforementioned manner, and allowed to stand still in a higher temperature and higher humidity environment at a temperature of 50° C. at a relative humidity of 90% for 5 days. Thereafter, the resulting toner cartridge was mounted in the same color laser printer. Then, a halftone image and a solid image were each printed continuously on 5 sheets, and checked for evaluation.

In the evaluation, a semiconductive roller suffering from defective image formation (with white streaking occurring on at least one of the sheets in the continuous printing) was rated as unacceptable (x), and a semiconductive roller free from defective image formation (with white streaking occurring on none of the sheets in the continuous printing) was rated as acceptable (o).

The results are shown in Tables 2 to 5.

TABLE 2

|  | Example 1 | Example 2 | Example 3 | Example 4 | Example 5 | Example 6 |
|---|---|---|---|---|---|---|
| Rubber component (parts by mass) | | | | | | |
| NBR | 70 | 50 | 30 | 70 | 70 | 70 |
| EPDM | 30 | 50 | 70 | 30 | 30 | 30 |
| Carbon black (parts by mass) | | | | | | |
| Electrically conductive | — | — | — | — | — | — |
| SAF | — | — | — | — | — | 22.5 |
| ISAF | 30 | 30 | 30 | 27.5 | 35 | — |
| HAF | — | — | — | — | — | — |
| FEF | — | — | — | — | — | — |
| Crosslinking component (parts by mass) | | | | | | |
| Sulfur powder | 1.50 | 1.50 | 1.50 | 1.50 | 1.50 | 1.50 |
| Accelerating agent CZ | 1.00 | 1.00 | 1.00 | 1.00 | 1.00 | 1.00 |
| Peroxide crosslinking agent | 2.00 | 2.00 | 2.00 | 2.00 | 2.00 | 2.00 |

TABLE 2-continued

|  | Example 1 | Example 2 | Example 3 | Example 4 | Example 5 | Example 6 |
|---|---|---|---|---|---|---|
| Zinc oxide Type 2 | 5 | 5 | 5 | 5 | 5 | 5 |
| Evaluation | | | | | | |
| Processability | ○ | ○ | ○ | ○ | ○ | ○ |
| Durability | ○ | ○ | ○ | ○ | ○ | ○ |
| Roller resistance (log R) | 5.4 | 5.5 | 5.6 | 6.5 | 4.0 | 5.7 |
| Actual machine test | | | | | | |
| Initial image | ○ | ○ | ○ | ○ | ○ | ○ |
| Image after sheet passage | ○ | ○ | ○ | ○ | ○ | ○ |
| Storage test | ○ | ○ | ○ | ○ | ○ | ○ |

TABLE 3

|  | Example 7 | Example 8 | Example 9 | Comparative Example 1 | Comparative Example 2 | Comparative Example 3 |
|---|---|---|---|---|---|---|
| Rubber component (parts by mass) | | | | | | |
| NBR | 70 | 70 | 70 | 80 | 20 | 70 |
| EPDM | 30 | 30 | 30 | 20 | 80 | 30 |
| Carbon black (parts by mass) | | | | | | |
| Electrically conductive | — | — | — | — | — | — |
| SAF | 32.5 | — | — | — | — | — |
| ISAF | — | — | — | 30 | 30 | 30 |
| HAF | — | 32.5 | 40 | — | — | — |
| FEF | — | — | — | — | — | — |
| Crosslinking component (parts by mass) | | | | | | |
| Sulfur powder | 1.50 | 1.50 | 1.50 | 1.50 | 1.50 | — |
| Accelerating agent CZ | 1.00 | 1.00 | 1.00 | 1.00 | 1.00 | — |
| Peroxide crosslinking agent | 2.00 | 2.00 | 2.00 | 2.00 | 2.00 | 2.00 |
| Zinc oxide Type 2 | 5 | 5 | 5 | 5 | 5 | 5 |
| Evaluation | | | | | | |
| Processability | ○ | ○ | ○ | ○ | ○ | ○ |
| Durability | ○ | ○ | ○ | x | ○ | ○ |
| Roller resistance (log R) | 4.3 | 6.4 | 4.0 | — | 5.9 | 5.2 |
| Actual machine test | | | | | | |
| Initial image | ○ | ○ | ○ | — | ○ | ○ |
| Image after sheet passage | ○ | ○ | ○ | — | ○ | x |
| Storage test | ○ | ○ | ○ | — | x | — |

TABLE 4

|  | Comparative Example 4 | Comparative Example 5 | Comparative Example 6 | Comparative Example 7 | Comparative Example 8 | Comparative Example 9 |
|---|---|---|---|---|---|---|
| Rubber component (parts by mass) | | | | | | |
| NBR | 70 | 70 | 70 | 70 | 70 | 70 |
| EPDM | 30 | 30 | 30 | 30 | 30 | 30 |
| Carbon black (parts by mass) | | | | | | |
| Electrically conductive | — | — | — | — | — | — |
| SAF | — | — | — | 20 | 35 | — |
| ISAF | 30 | 25 | 40 | — | — | — |
| HAF | — | — | — | — | — | 30 |
| FEF | — | — | — | — | — | — |
| Crosslinking component (parts by mass) | | | | | | |
| Sulfur powder | 1.50 | 1.50 | 1.50 | 1.50 | 1.50 | 1.50 |
| Accelerating agent CZ | 1.00 | 1.00 | 1.00 | 1.00 | 1.00 | 1.00 |
| Peroxide crosslinking agent | — | 2.00 | 2.00 | 2.00 | 2.00 | 2.00 |
| Zinc oxide Type 2 | 5 | 5 | 5 | 5 | 5 | 5 |
| Evaluation | | | | | | |
| Processability | ○ | ○ | ○ | ○ | ○ | ○ |
| Durability | ○ | ○ | ○ | ○ | ○ | ○ |
| Roller resistance (log R) | 5.3 | 7.5 | 3.5 | 7.2 | 3.3 | 7.5 |
| Actual machine test | | | | | | |

TABLE 4-continued

|  | Comparative Example 4 | Comparative Example 5 | Comparative Example 6 | Comparative Example 7 | Comparative Example 8 | Comparative Example 9 |
|---|---|---|---|---|---|---|
| Initial image | ○ | x | x | x | x | x |
| Image after sheet passage | x | — | — | — | — | — |
| Storage test | — | — | — | — | — | — |

TABLE 5

|  | Comparative Example 10 | Comparative Example 11 | Comparative Example 12 | Comparative Example 13 |
|---|---|---|---|---|
| Rubber component (parts by mass) | | | | |
| NBR | 70 | 70 | 70 | 70 |
| EPDM | 30 | 30 | 30 | 30 |
| Carbon black (parts by mass) | | | | |
| Electrically conductive | — | — | 20 | 30 |
| SAF | — | — | — | — |
| ISAF | — | — | — | — |
| HAF | 45 | — | — | — |
| FEF | — | 50 | — | — |
| Crosslinking component (parts by mass) | | | | |
| Sulfur powder | 1.50 | 1.50 | 1.50 | 1.50 |
| Accelerating agent CZ | 1.00 | 1.00 | 1.00 | 1.00 |
| Peroxide crosslinking agent | 2.00 | 2.00 | 2.00 | 2.00 |
| Zinc oxide Type 2 | 5 | 5 | 5 | 5 |
| Evaluation | | | | |
| Processability | ○ | x | ○ | ○ |
| Durability | ○ | — | ○ | ○ |
| Roller resistance (log R) | 3.4 | — | 7.2 | 5.2 |
| Actual machine test | | | | |
| Initial image | x | — | x | x |
| Image after sheet passage | — | — | — | — |
| Storage test | — | — | — | — |

The results for Comparative Example 1 in Table 3 indicate that, where the proportion of the EPDM in the rubber component was lower with the mass ratio between the NBR and the EPDM being NBR/EPDM=80/20, the durability was insufficient, and the outer peripheral surface was cracked due to the irradiation with the ultraviolet radiation. Therefore, the semiconductive roller of Comparative Example 1 was not evaluated for the characteristic properties.

The results for Comparative Example 2 indicate that, where the proportion of the NBR in the rubber component was lower with the mass ratio between the NBR and the EPDM being NBR/EPDM=20/80, uneven image density occurred due to accumulation of the additives such as silica in the image evaluation after the sheet passage. This means that the oxide film was not properly formed in the outer peripheral surface.

The results for Comparative Example 3 indicate that, where only the peroxide crosslinking agent was used as the crosslinking component, defective image formation occurred in the storage test. When the defective state was checked, the semiconductive roller adhered to the photoreceptor body. This means that the rubber component was not crosslinked.

The results for Comparative Example 4 in Table 4 indicate that, where only the sulfur and the sulfenamide accelerating agent were used as the crosslinking component, defective image formation (nip mark) occurred in the storage test. When the defective state was checked, a contact portion of the semiconductive roller kept in contact with the photoreceptor body during the storage was compressively deformed. This means that the rubber component was insufficiently crosslinked.

The results for Comparative Example 11 in Table 5 indicate that, where the FEF was used as the carbon black and the FEF was blended in a proportion of 50 parts by mass based on 100 parts by mass of the overall rubber component for reduction of the roller resistance of the semiconductive roller, the tubular body was excessively hard after the crosslinking, making it impossible to smoothly insert the metal shaft through the tubular body.

The results for Comparative Examples 12 and 13 indicate that, where the electrically conductive carbon black was used as the carbon black, variations in electrical resistance due to lower dispersibility of the electrically conductive carbon black were not sufficiently accommodated by the oxide film, making it impossible to uniformly electrically charge the surface of the photoreceptor body. This resulted in defective image formation such as uneven image density.

The results for Examples 1 to 9 indicate that, where the mass ratio between the NBR and the EPDM as the rubber component is NBR/EPDM=70/30 to 70/30 and at least one carbon black selected from the group consisting of the SAF, the ISAF and the HAF is used, the problems described above can be eliminated by using the sulfur, the peroxide crosslinking agent and the sulfenamide accelerating agent in combination as the crosslinking component. Thus, the semiconductive roller having a uniform electrical resistance without variations in electrical resistance in the circumferential direction and the widthwise direction of the outer peripheral surface thereof can be produced at lower costs as compared with the prior art.

However, the results for Examples 1, 4 and 5 and Comparative Examples 5 and 6 indicate that, where the ISAF is used as the carbon black, the proportion of the ISAF is preferably not less than 27.5 parts by mass and not greater than 35 parts by mass based on 100 parts by mass of the overall rubber component in order to control the roller resistance in a range of not less than $10^4 \Omega$ and not greater than $10^{6.5} \Omega$ to ensure proper image formation.

Further, the results for Examples 6 and 7 and Comparative Examples 7 and 8 indicate that, where the SAF is used as the carbon black, the proportion of the SAF is preferably not less than 22.5 parts by mass and not greater than 32.5 parts by mass based on 100 parts by mass of the overall rubber component in order to control the roller resistance in the aforementioned range to ensure proper image formation.

Further, the results for Examples 8 and 9 and Comparative Examples 9 and 10 indicate that, where the HAF is used as the carbon black, the proportion of the HAF is preferably not less than 32.5 parts by mass and not greater than 40 parts by mass based on 100 parts by mass of the overall rubber component in order to control the roller resistance in the aforementioned range to ensure proper image formation.

What is claimed is:

1. A semiconductive roller comprising:
   a tubular body formed by crosslinking a rubber composition;
   a shaft inserted through the tubular body; and
   an oxide film provided in an outer peripheral surface of the tubular body;
   the rubber composition comprising:
   a rubber component including only an acrylonitrile butadiene rubber (NBR) and an ethylene propylene diene rubber (EPDM) in a mass ratio of NBR/EPDM=70/30 to 30/70;
   a predetermined proportion of at least one carbon black selected from the group consisting of SAF, ISAF and HAF, the predetermined proportion being adjusted to be less than 50 parts by mass based on 100 parts by mass of the overall rubber component so that the semiconductive roller has a roller resistance of not less than $10^4 \Omega$ and not greater than $10^{6.5} \Omega$; and
   a crosslinking component including sulfur, a peroxide crosslinking agent and a sulfenamide accelerating agent for crosslinking the rubber component.

2. The semiconductive roller according to claim 1, wherein the rubber composition further comprises at least one selected from the group consisting of a crosslinking assisting agent, a filler, an anti-aging agent, an anti-oxidant, an anti-scorching agent, a lubricant, a pigment, a flame retarder, a neutralizing agent and a defoaming agent.

3. The semiconductive roller according to claim 2, which is used as a charging roller in an electrophotographic image forming apparatus.

4. The semiconductive roller according to claim 1, which is used as a charging roller in an electrophotographic image forming apparatus.

5. A semiconductive roller production method comprising the steps of:
   preparing a rubber composition comprising a rubber component including only an acrylonitrile butadiene rubber (NBR) and an ethylene propylene diene rubber (EPDM) in a mass ratio of NBR/EPDM=70/30 to 30/70, a predetermined proportion of at least one carbon black selected from the group consisting of SAF, ISAF and HAF, the predetermined proportion being adjusted to be less than 50 parts by mass based on 100 parts by mass of the overall rubber component so as to control roller resistance in a range of not less than $10^4 \Omega$ and not greater than $10^{6.5} \Omega$, and a crosslinking component including sulfur, a peroxide crosslinking agent and a sulfenamide accelerating agent for crosslinking the rubber component;
   extruding the rubber composition into a tubular body in an unvulcanized state;
   crosslinking the unvulcanized rubber composition extruded into the tubular body in a vulcanization can or with the use of a continuous crosslinking apparatus, and then inserting a shaft through the tubular body of the vulcanized rubber composition; and
   forming an oxide film in an outer peripheral surface of the tubular body of the rubber composition by irradiation of the outer peripheral surface with ultraviolet radiation with the shaft inserted through the tubular body.

6. The semiconductive roller production method according to claim 5, further comprising the step of polishing the outer peripheral surface before the irradiation with the ultraviolet radiation after the insertion of the shaft.

* * * * *